United States Patent [19]

Takahashi et al.

[11] Patent Number: 5,296,957
[45] Date of Patent: Mar. 22, 1994

[54] OPTICAL REPEATER HAVING LOOP-BACK FUNCTION USED IN TRANSMISSION SYSTEM

[75] Inventors: Masaaki Takahashi, Yokosuka; Takanori Maki; Kazuya Amaki, both of Kawasaki; Katsumi Kikawa, Ichikawa; Mitsushi Nitta, Kawasaki, all of Japan

[73] Assignee: Fujitsu Limited, Kanagawa, Japan

[21] Appl. No.: 759,483

[22] Filed: Sep. 13, 1991

[30] Foreign Application Priority Data

Sep. 18, 1990 [JP] Japan .................................. 2-248482
Sep. 18, 1990 [JP] Japan .................................. 2-248483

[51] Int. Cl.⁵ ...................... H04B 10/02; H04B 10/00
[52] U.S. Cl. .................................. 359/177; 359/174; 359/166
[58] Field of Search ............. 359/110, 141, 154, 166, 359/174, 179, 160, 177, 194; 372/6; 375/3; 370/15, 13.1

[56] References Cited

U.S. PATENT DOCUMENTS

| 5,050,949 | 9/1991 | DiGiovanni et al. | 372/6 |
| 5,054,876 | 10/1991 | Grasso et al. | 385/24 |
| 5,083,874 | 1/1992 | Aida et al. | 359/154 |

FOREIGN PATENT DOCUMENTS

| 62-200830 | 9/1987 | Japan . |
| 62-233940 | 10/1987 | Japan . |
| 1-62928 | 3/1989 | Japan . |
| 1-64424 | 3/1989 | Japan . |
| 1-133437 | 5/1989 | Japan . |
| 1-144731 | 6/1989 | Japan . |
| 1-221941 | 9/1989 | Japan . |
| 2-36625 | 2/1990 | Japan . |
| 0415438 | 8/1990 | Japan . |
| 1-63924 | 7/1991 | Japan | 357/177 |
| 2123236 | 1/1984 | United Kingdom . |
| 2183973 | 6/1987 | United Kingdom . |
| 2207019 | 1/1989 | United Kingdom . |
| 2236235 | 3/1991 | United Kingdom . |

Primary Examiner—Donald Woodiel
Assistant Examiner—Rafael Bacares

[57] ABSTRACT

An optical repeater having a loop-back function is provided in a transmission system including first and second transmission lines. The optical repeater includes a first optical amplifier connected to the first transmission line, a second optical amplifier connected to the second transmission line, a loop-back unit connected to both transmission lines, and a control unit. The control unit controls the loop-back unit to form a loop-back line when a loop-back instruction is detected. Therefore, optical signals are directly amplified without being converted into electrical signals, and a loop-back signal (return signal) and optical signals are not mixed in the optical repeater so that a loop-back operation can be correctly carried out in an optical repeater having a small size and low power consumption.

27 Claims, 10 Drawing Sheets

OPTICAL REPEATER HAVING LOOP-BACK FUNCTION USED IN TRANSMISSION SYSTEM

BACKGROUND OF THE INVENTION

1. Field of the Invention

The present invention relates to an optical repeater used in a transmission system and, more particularly, to an optical repeater having a loop-back function used in a submarine optical cable communication system.

2. Description of the Related Art

In a transmission system between two or more terminal stations using repeaters, a transmission of service signals and a monitoring of the whole transmission system are usually important, and a loop-back method (loop-back operation), which is one monitoring method and is used to check a faulty portion from the terminal station through the repeater, are known in the prior art. Further, it is preferable to apply the loop-back method to the transmission system to detect and confirm a faulty portion thereof.

For example, in a submarine optical cable communication system using optical marine cables, a plurality of optical repeaters are provided at specific intervals (from about several tens of kilometers to about one hundred kilometers) in the optical marine cable, to amplify optical signals. This submarine optical cable communication system is used to communicate between two or more landing stations at a distance of about from a few hundred kilometers to ten thousand kilometers, and is used to realize a long distance communication, e.g., an international communication. Further, in the submarine optical cable communication system, the loop-back method is used to detect and confirm a faulty portion in the optical marine cables or the optical repeaters which may be located under the sea (submerged) at a depth of 8,000 meters.

In the prior art optical repeater, for example, optical signals are converted to electrical signals by opto-electrical conversion units of an up transmission line and a down transmission line. Further, electrical signals are carried out in various processes, e.g., an equivalent amplification process, an identificative regeneration process, and a monitor-control process, by signal processing units, and then the processed signals are reconverted to optical signals by electro-optical conversion units of the up transmission line and the down transmission line. In a transmission system or submarine optical cable communication system of the prior art, indirect optical repeaters are mainly used.

In the above described optical repeater of the prior art, or the indirect optical repeater, conversion processes between the optical signals and electrical signals must be carried out, and thus a circuit scale of the repeater becomes large and the power consumption thereof is increased. Further, when a loop-back operation is carried out, the loop-back signals are mixed, at an optical mixer, with optical signals of the opposite transmission line output from the other terminal station.

SUMMARY OF THE INVENTION

An object of the present invention is to directly amplify optical signals without converting the optical signals to electrical signals, to thereby reduce a size and power consumption of an optical repeater, and without mixing with optical signals of the opposite transmission line.

According to the present invention, there is provided an optical repeater having a loop-back function used in a transmission system including first and second transmission lines and comprising a first optical amplifier, connected to the first transmission line, for directly amplifying optical signals transferred from a first terminal station through the first transmission line; a second optical amplifier, connected to the second transmission line, for directly amplifying optical signals transferred from a second terminal station through the second transmission line; a loop-back unit, connected to the first and second transmission line, for constituting a loop-back line; and a control unit, connected to the first and second amplifiers and the loop-back unit, for controlling the loop-back unit to constitute the loop-back line when detecting a loop-back instruction output from one of the terminal stations through a corresponding one of the optical amplifiers.

The loop back unit may comprise first and second optical switches and first and second optical splitters; wherein the first optical switch, the first optical amplifier, and the first optical splitter are provided in series along the first transmission line, and the second optical switch, the second optical amplifier, and the second optical splitter are provided in series along the second transmission line.

The control unit may switch one of the optical switches to a normal state and switch the other of the optical switches to a loop-back state, to thereby constitute a loop-back line when a loop-back instruction is detected. The loop-back line may be constituted by the first optical switch, the first optical amplifier, the first optical splitter, the second optical switch, the second optical amplifier, and the second optical splitter, when the loop-back instruction is transferred from the first terminal station through the first transmission line. Further, the loop-back line may be constituted by the second optical switch, the second optical amplifier, the second optical splitter, the first optical switch, the first optical amplifier, and the first optical splitter, when the loop-back instruction is transferred from the second terminal station through the first transmission line. The optical repeater may further comprise a first optical attenuator provided between the first optical splitter and the second optical switch, and a second optical attenuator provided between the second optical splitter and the first optical switch.

Further, the loop back unit may comprise first and second optical line shutters, first and second optical mixers, first and second optical loop shutters, and first and second optical splitters; wherein the first optical line shutter, the first optical mixer, the first optical amplifier, and the first optical splitter are provided in series along the first transmission line, and the second optical line shutter, the second optical mixer, the second optical amplifier, and the second optical splitter are provided in series along the second transmission line.

Furthermore, the loop back unit may comprise first and second optical line shutters, first and second optical mixers, first and second optical loop shutters, and first and second optical splitters; wherein the first optical mixer, the first optical amplifier, the first optical splitter, and the first optical line shutter are provided in series along the first transmission line, and the second optical mixer, the second optical amplifier, the second optical splitter, and the second optical line shutter are provided in series along the second transmission line.

The control unit may close one of the optical line shutters as a loop-back state and open the other of the optical line shutters as a normal state, and may open one of the optical loop shutters as the loop-back state and close the other of the optical loop shutters as the normal state, to constitute a loop-back line, when the loop-back instruction is detected. The loop-back line may be constituted by the first optical mixer, the first optical amplifier, the first optical splitter, the first optical loop shutter, the second optical mixer, the second optical amplifier, the second optical splitter, and the second optical line shutter, when the loop-back instruction is transferred from the first terminal station through the first transmission line. Further, the loop-back line may be constituted by the second optical mixer, the second optical amplifier, the second optical splitter, the second optical loop shutter, the first optical mixer, the first optical amplifier, the first optical splitter, and the first optical line shutter, when the loop-back instruction is transferred from the second terminal station through the first transmission line. The optical repeater may further comprise a first optical attenuator provided between the first optical loop shutter and the second optical mixer, and a second optical attenuator provided between the second optical loop shutter and the first optical mixer.

In addition, the loop back unit may comprise first and second optical mixers, first and second optical splitters, and first and second optical loop shutters wherein the first optical mixer, the first optical amplifier, and the first optical splitter are provided in series along the first transmission line, and the second optical mixer, the second optical amplifier, and the second optical splitter are provided in series along the second transmission line.

A loop-back operation may be carried out in a specific optical repeater by a loop-back instruction output from one of the terminal stations, and an up direction optical repeater located upstream of the specific optical repeater may be controlled to cut optical signals by an output-cut instruction output by the one of the terminal stations.

The optical amplifier may comprise an optical mixer for adding pump light to the optical signals, erbium-doped optical fibers, an optical splitter for branching the optical signals from the fibers, an opto-electrical conversion unit for converting the optical signals to electrical signals, an auto gain control circuit for automatically controlling the gain of signals output from the opto-electrical conversion unit, and a laser diode for generating the pump light in accordance with electrical output signals of the auto gain control circuit.

The opto-electrical conversion unit may be constituted by a photo diode. The optical amplifier may further comprise a first optical shutter provided between the laser diode and the optical mixer, and a second optical shutter provided between the laser diode and the optical mixer.

The control unit may be constituted by first and second bandpass filters, for picking up supervisory signals from electrical signals output from the opto-electrical conversion units, and first and second supervisory units, for amplitude-modulating an optical output of the laser diode by receiving the supervisory signals from the bandpass filters. The supervisory signals may include a frequency assigned for each optical repeater and the supervisory signals may be continuously transferred from one of the terminal stations, and when the transferring of the supervisory signals is stopped, the loop-back instruction or the output-cut instruction may be set. The transmission system may be specified as a submarine optical cable communication system.

BRIEF DESCRIPTION OF THE DRAWINGS

The present invention will be more clearly understood from the description of the preferred embodiments as set forth below with reference to the accompanying drawings, wherein.

DESCRIPTION OF THE PREFERRED EMBODIMENTS

First, for a better understanding of the preferred embodiments, an optical repeater according to the prior art will be explained with reference to FIG. 1.

Figure 1:
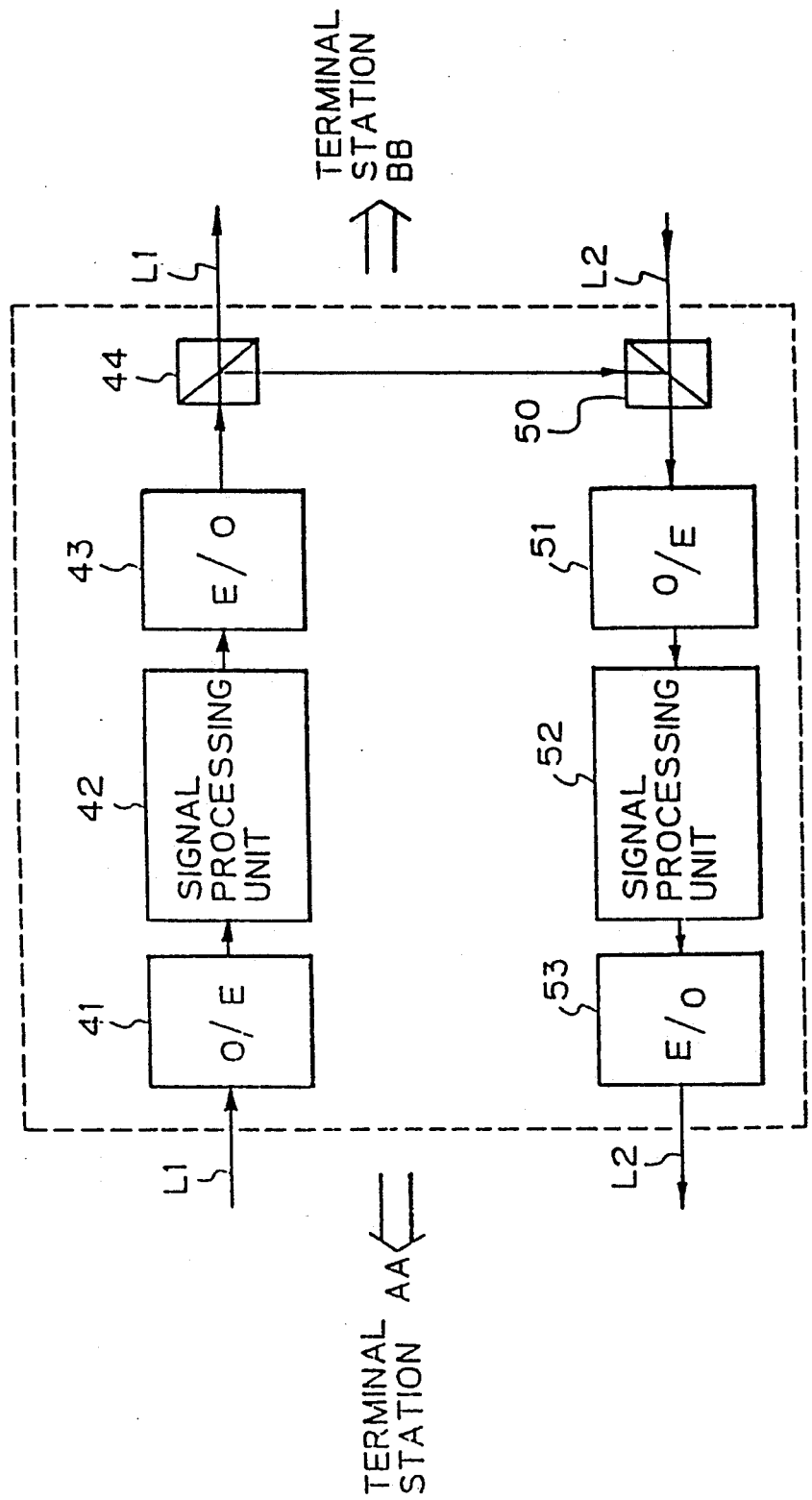
FIG. 1 is a block diagram of optical repeater according to the prior art.

FIG. 1 is a block diagram of an optical repeater according to the prior art. In FIG. 1, reference numerals 41, 51 denote opto-electrical conversion units (O/E); 42, 52 denote signal processing units; 43, 53 denote electro-optical conversion units (E/O); 44 denotes an optical splitter; and 50 denotes a mixer.

As shown in FIG. 1, in the prior art optical repeater, optical signals are converted to electrical signals by the opto-electrical conversion units 41 and 51 of an up transmission line L1 and a down transmission line L2. Further, electrical signals are subjected to various processes such as an equivalent amplification process, an identificative regeneration process and a monitor-control process, by signal processing units 42, 52, and the processed signals are then reconverted to optical signals by electro-optical conversion units 43 and 53 of the up transmission line L1 and the down transmission line L2. In a transmission system, or submarine optical cable communication system of the prior art, an indirect optical repeater as described above is mainly used.

When a loop-back operation (method) is carried out from a terminal station AA in a transmission system (or submarine optical cable communication system) using the above indirect optical repeaters, the optical splitter 44 and the optical mixer 50 are used, and optical signals output from the terminal station AA are transferred to the opto-electrical conversion unit 51 through the opto-electrical conversion unit 41, the signal processing unit 42, the electro-optical conversion unit 43, the optical splitter 44, and the optical mixer 50. Further, the electrical signals output from the opto-electrical conversion unit 51 are returned to the terminal station AA through the signal processing unit 52 and the electro-optical conversion unit 53.

In the above described optical repeater of the prior art, or the indirect optical repeater, the conversion processes between the optical signals and the electrical signals must be carried out, and thus a circuit scale of the repeater becomes large and the power consumption thereof is increased.

Further, when the loop-back operation is carried out in the prior art optical repeater shown in FIG. 1, the optical signals for the loop-back operation are mixed with optical signals of the opposite transmission line (down transmission line L2) output from the other terminal station (BB) in the optical mixer 50. Therefore, when the loop-back operation is carried out in the prior art optical repeater, the optical signals of the opposite transmission line must be cut to monitor the optical signals for the loop-back operation from the optical repeater.

Figure 2:
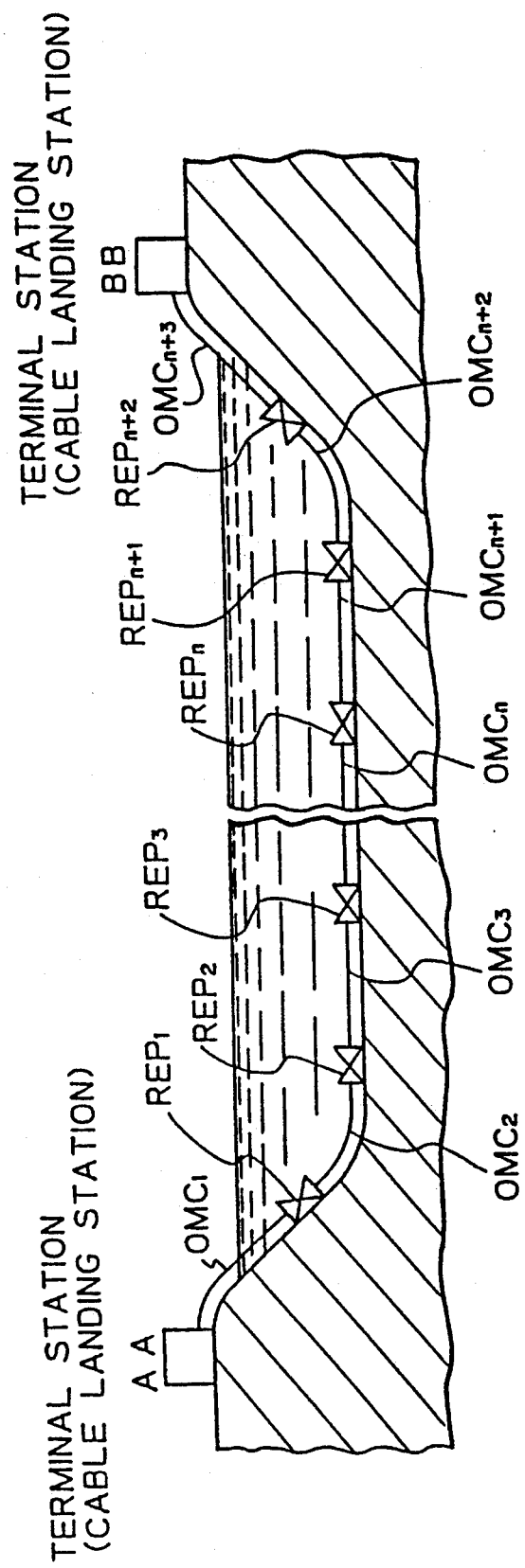
FIG. 2 is a diagrammatic view of a submarine optical cable communication system using a plurality of optical repeaters.

FIG. 2 is a diagram showing a submarine optical cable communication system using a plurality of optical repeaters. In FIG. 2, references AA, BB denote terminal stations (cable landing stations), $REP_1$, $REP_2$, $REP_3$, ..., $REP_n$, $REP_{n+1}$, $REP_{n+2}$ denote optical repeaters, and $OMC_1$, $OMC_2$, $OMC_3$, ..., $OMC_n$, $OMC_{n+1}$, $OMC_{n+2}$, $OMC_{n+3}$ denote optical marine cables.

As shown in FIG. 2, the terminal station AA is connected to the terminal station BB through the optical repeaters $REP_1$, $REP_2$, $REP_3$, ..., $REP_n$, $REP_{n+1}$, $REP_{n+2}$ and the optical marine cables $OMC_1$, $OMC_2$, $OMC_3$, ..., $OMC_n$, $OMC_{n+1}$, $OMC_{n+2}$, $OMC_{n+3}$. This submarine optical cable communication system is used to communicate between the terminal stations AA and BB, and the distance between the terminal stations AA and BB is, for example, several hundred kilometers to ten thousand kilometers. Further, the optical repeaters $REP_1$, $REP_2$, $REP_3$, ..., $REP_n$, $REP_{n+1}$, $REP_{n+2}$ are provided at specified intervals, e.g., several tens of kilometers to one hundred kilometers. In addition, the optical marine cables and the optical repeaters are located under the sea (submerged), e.g., at a depth of 8,000 meters.

In this submarine optical cable communication system, when a loop-back operation for an optical repeater $REP_n$ is carried out from the terminal station AA, and further, when a loop-back signal (returned signal) output from the optical repeater $REP_n$ is correctly returned to the terminal station AA, it is confirmed that no faulty portion exists in the optical repeaters $REP_1$, $REP_2$, $REP_3$, ..., $REP_n$ and the optical marine cables $OMC_1$, $OMC_2$, $OMC_3$, ..., $OMC_n$ located between the terminal station AA and the optical repeater $REP_n$.

Further, when a loop-back operation for an optical repeater $REP_{n+1}$ is carried out from the terminal station AA, and further, when a loop-back signal output from the optical repeater $REP_{n+1}$ is not correctly returned to the terminal station AA, it is detected that a faulty portion exists in the optical repeater $REP_{n+1}$ or the optical marine cable $OMC_{n+1}$ located between the optical repeaters $REP_n$ and $REP_{n+1}$. Namely, when the loop-back signal from the optical repeater $REP_{+1}$ is not returned, or is extremely attenuated, or the loop-back signal includes noise components, it is determined that an obstruction exists in the optical repeater $REP_{n+1}$ or the optical marine cable $OMC_{n+1}$. Note, the obstruction of the optical repeater $REP_{n+1}$ comprises, for example, damage to or a destruction of the signal processing unit, and the like, and the obstruction in the optical marine cable $OMC_{n+1}$ comprises, for example, damage to or a break in the cable, and the like.

The above described loop-back method (operation) is known in the prior art, and this loop-back method is used in the present invention.

Next, the principle configurations and the preferred embodiments according to the present invention will be explained below.

Figure 3:
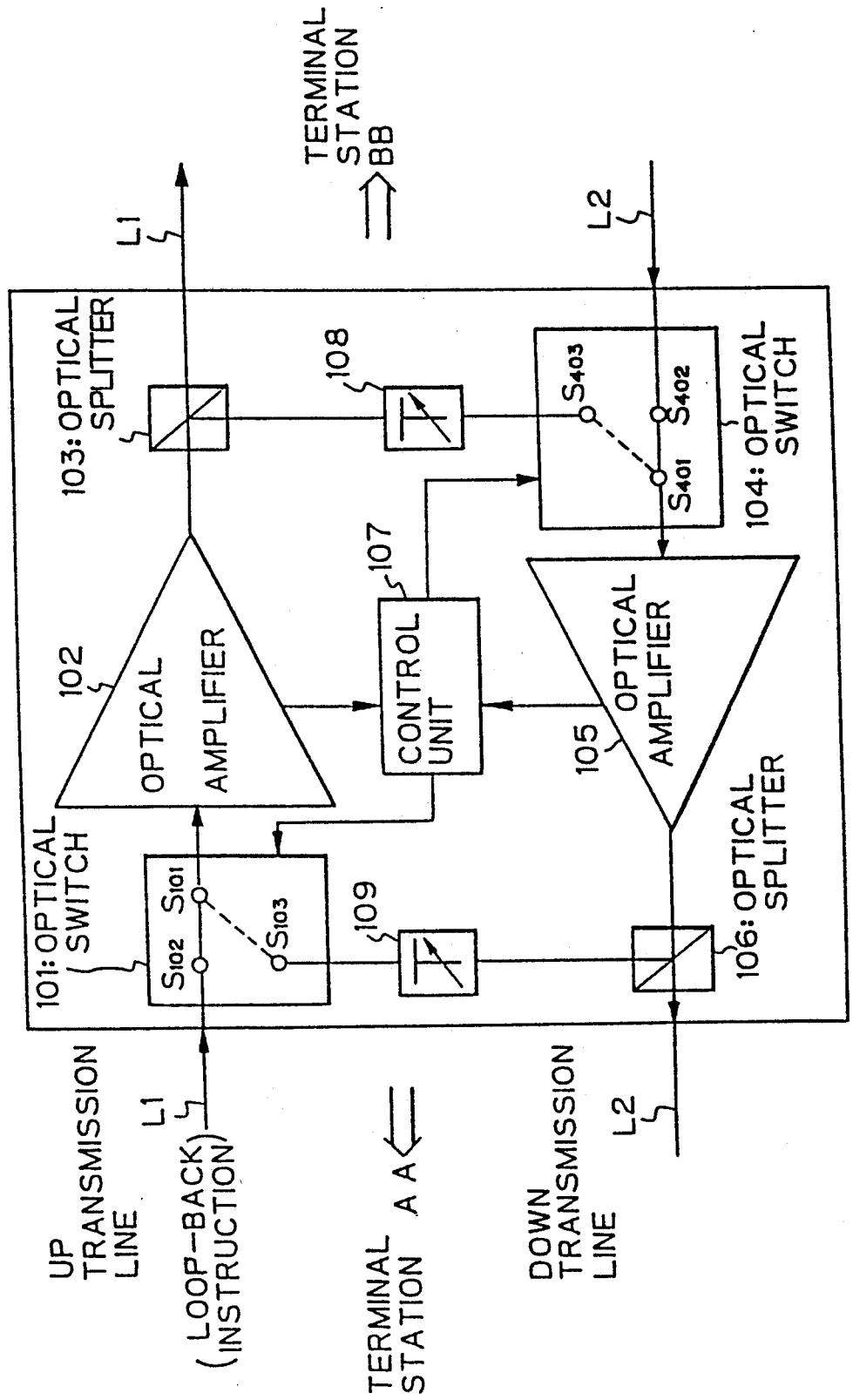
FIG. 3 is a block diagram showing a principle configuration of an optical repeater according to a first embodiment of the present invention.

FIG. 3 is a block diagram indicating a principle configuration of an optical repeater according to a first aspect of the present invention.

As shown in FIG. 3, an optical repeater according to a first embodiment of the present invention comprises optical switches 101, 104, optical amplifiers 102, 105, optical splitters 103, 106, control unit 107, and optical attenuators 108, 109. The optical switch 101, the optical amplifier 102, and the optical splitter 103 are provided in series along the optical direction of an up transmission line L1. Similarly, the optical switch 104, the optical amplifier 105, and the optical splitter 106 are provided in series along the optical direction of a down transmission line L2. The control unit 107 is used to detect a loop-back instruction output from one terminal station (for example, terminal station AA) through one optical amplifier 102, to control the switching state of one optical switch 101 of the up transmission line L1 as a normal transmission side, and to control the switching state of the other optical switch 104 from a normal transmission side to a loop-back side, so that a loop-back line is constituted.

In the optical repeater according to the first embodiment of the present invention shown in FIG. 3, when a loop-back instruction is transferred through the up transmission line L1 from the terminal station AA, the loop-back instruction is detected by the control unit 107 through the optical switch 101 and the optical amplifier 102. As indicated by a solid line in FIG. 3, the optical switch 101 is controlled to connect the up transmission line L1 to the optical amplifier 102 as a normal transmission side. Namely, in the optical switch 101, a terminal $S_{101}$ is connected to a terminal $S_{102}$. Further, as indicated by a broken line in FIG. 3, the optical switch 104 of the opposite transmission line (down transmission line L2) is switched from a normal transmission side to a loop-back side by the control unit 107 so that a loop-back line is constituted. In the optical switch 104, a terminal $S_{401}$ is connected to a terminal $S_{403}$.

Namely, when the loop-back instruction is output from the terminal station AA through the up transmission line L1, the loop-back line is constituted by the optical switch 101→the optical amplifier 102→the optical splitter 103→the optical switch 104→the optical amplifier 105→the optical splitter 106, and a loop-back signal (return signal) is returned to the terminal station AA through the down transmission line L2. Note, the optical attenuator 108 can be provided between the optical splitter 103 and the optical switch 104.

Similarly, when a loop-back instruction is transferred through the down transmission line L2 from the terminal station BB, the loop-back instruction is detected by the control unit 107 through the optical switch 104 and the optical amplifier 105. As indicated by a solid line in FIG. 3, the optical switch 104 is controlled to connect the down transmission line L2 to the optical amplifier 105 as a normal transmission side. Namely, in the optical switch 104, a terminal $S_{401}$ is connected to a terminal $S_{402}$. Further, as indicated by a broken line in FIG. 3, the optical switch 101 of the opposite transmission line (up transmission line L1) is switched from a normal transmission side to a loop-back side by the control unit 107, so that a loop-back line is constituted. In the optical switch 101, a terminal $S_{101}$ is connected to a terminal $S_{103}$.

Namely, when the loop-back instruction is output from the terminal station BB through the down transmission line L2, the loop-back line is constituted by the optical switch 104→the optical amplifier 105→the optical splitter 106→the optical switch 101→the optical amplifier 102→the optical splitter 103, and a loop-back signal (return signal) is returned to the terminal station BB through the up transmission line L1. The optical attenuator 109 can be provided between the optical splitter 106 and the optical switch 101.

As described above, in the optical repeater carrying out the loop-back operation according to a first aspect of the present invention, optical signals for the loop-back operation are not mixed with the optical signals of the opposite transmission line.

Figure 4:
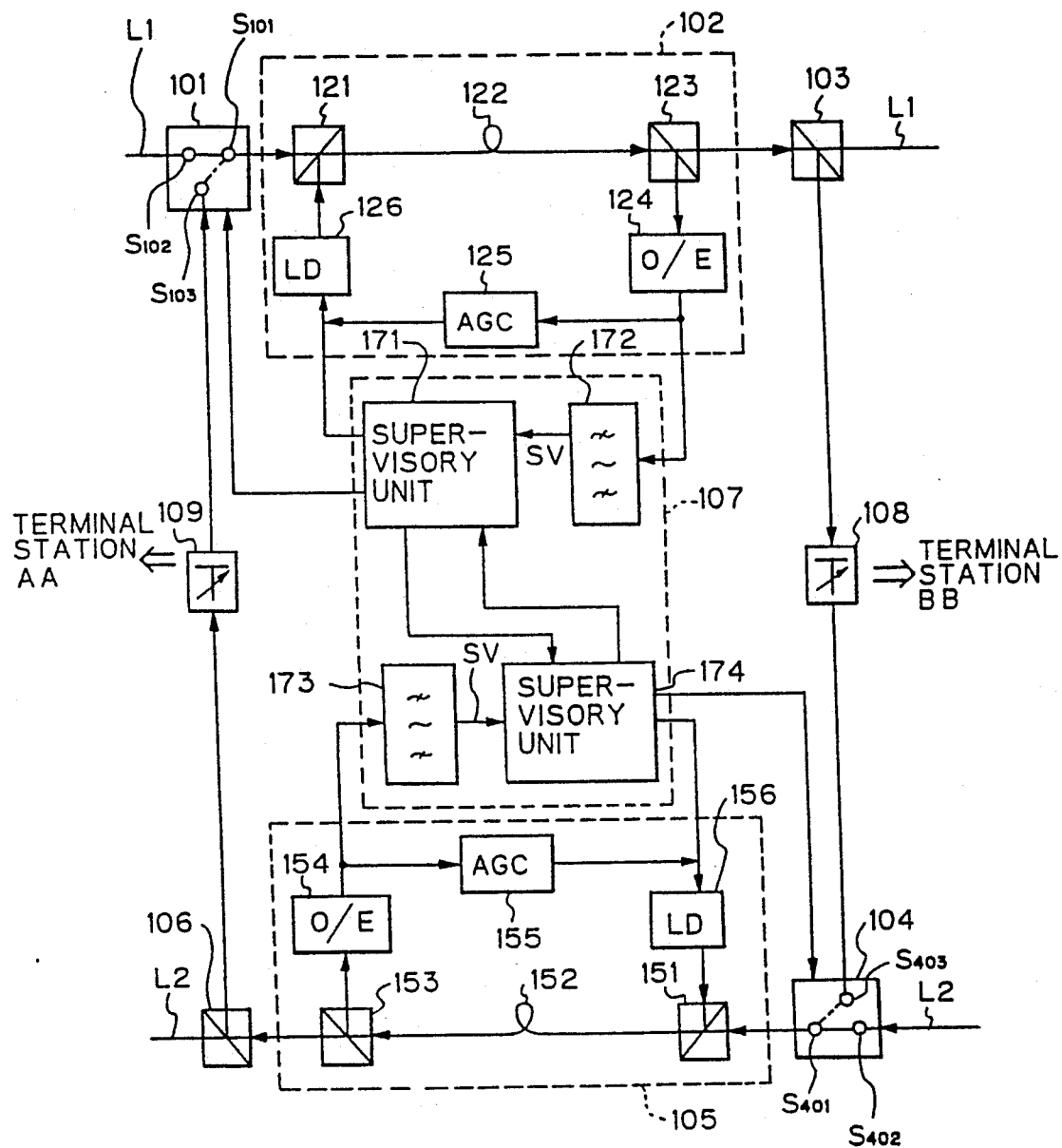
FIG. 4 is a block diagram of the optical repeater according to the first embodiment of the present invention.

FIG. 4 is a block diagram of the optical repeater according to the first embodiment of the present invention.

As shown in FIG. 4, in this embodiment, each of the optical amplifiers 102 (105) is constituted by an optical mixer (photocoupler) 121 (151), erbium-doped optical fibers (EDF) 122 (152), an optical splitter (beam splitter) 123 (153), an opto-electrical conversion unit (O/E) 124 (154), an auto gain control (AGC) circuit 125 (155), and a laser diode (LD) 126 (156).

The optical mixers 121, 151 are used to add pump light to optical signals from optical switch 101, 104, and optical splitters 123, 153 are used to branch optical signals from the fibers (EDF) 122, 152. The opto-electrical conversion units (O/E) 124, 154, which are constituted by photo diodes, are used to convert optical signals to electrical signals, and the AGC circuits 125, 155 are used to automatically control the gain of signals output from the opto-electrical conversion units 124, 154. The laser diodes (LD) 126, 156 are used to generate the pump light in accordance with electrical output signals of the AGC circuits 125, 155.

Further, the control unit 107 is constituted by bandpass filters 172, 173 and supervisory units (SV) 171, 174. The bandpass filters 172, 173 are used to pick up supervisory signals SV from electrical signals output from the opto-electrical conversion units 124, 154, and the supervisory units 171, 174 are used to amplitude-modulate optical output of the laser diode 126, 156 by receiving the supervisory signals SV from the bandpass filters 172, 173. Note, the supervisory units 171 and 174 are interconnected, and one supervisory unit 171 controls the optical switch 101, and the other supervisory unit 174 controls the optical switch 104.

For example, in a normal operation of an up transmission line L1 of the above-described optical repeater, optical signals output from the terminal station AA are directly amplified by pumping in the optical mixers 121 through the optical switch 101 connecting to the up transmission line L1, and the amplified optical signals are output to the terminal station BB through the optical splitter 123 and the up transmission line L1. In this case, the optical signals are branched by the optical splitter 123 and converted to electrical signals by the opto-electrical conversion unit 124, and then the signals are supplied to the laser diode 126, which is an electro-optical conversion unit, by carrying out the automatic gain control of the AGC circuit 125, so that output signals of the AGC circuit 125, or output signals of the optical repeater, are maintained at a constant level.

The electrical signals output from the opto-electrical conversion unit 124 are also supplied to the bandpass filter 172, and the supervisory signals SV are divided from the electrical signals and transferred to the supervisory unit 171. Some supervisory signals of the supervisory unit 171 are transferred to the other supervisory unit 174, which monitors the opposite transmission line (or down transmission line L2). Further, some supervisory signals are transferred from the supervisory unit 174 to the supervisory unit 171 to control the laser diode 126.

Further, the input of the laser diode 126 is defined as the signals mixed by the outputs of the AGC circuit 125 and the supervisory unit 171, the output of the AGC circuit 125 is maintained at a constant level, and the supervisory signals SV output from the supervisory unit 171 are specified as the shape of the constant output of the AGC circuit 125 amplitude-modulated by the supervisory signals SV of the supervisory unit 171. For example, the optical signals from the terminal station AA (BB) to the terminal station BB (AA) for transferring communication data, or carrying out an optical communication are specified as 10 Gbit/sec., or 10 GHz, and the supervisory signals SV, which may be amplitude-modulated and carried by the optical signals output from the terminal station, are specified as about 10 MHz. Namely, the frequency of the supervisory signals SV is much lower than that of the optical signals output from the terminal station, and thus the supervisory signals SV can be divided from the electrical signals output from the opto-electrical conversion unit 124 (154) by using only the band pass filter 172 (173). Therefore, the circuit configuration of the control unit 107 can be simplified, and a circuit scale thereof made smaller.

In the above described optical repeater, for example, when a loop-back instruction is transferred from the terminal station (BB), the loop-back instruction is detected by the supervisory unit (174) from the supervisory signals SV, and then, for example, the optical switch (101) is switched to a loop-back side and the optical switch (104) is switched to a normal transmission line side so that a loop-back line is constituted by the supervisory unit (174, 171). The supervisory unit 171 is previously determined as a main control unit. Further, when the loop-back operation is completed, a loop-back finish instruction is transferred from the terminal station (BB), and then the optical switches 101 and 104 are returned to the normal positions.

Figure 5:
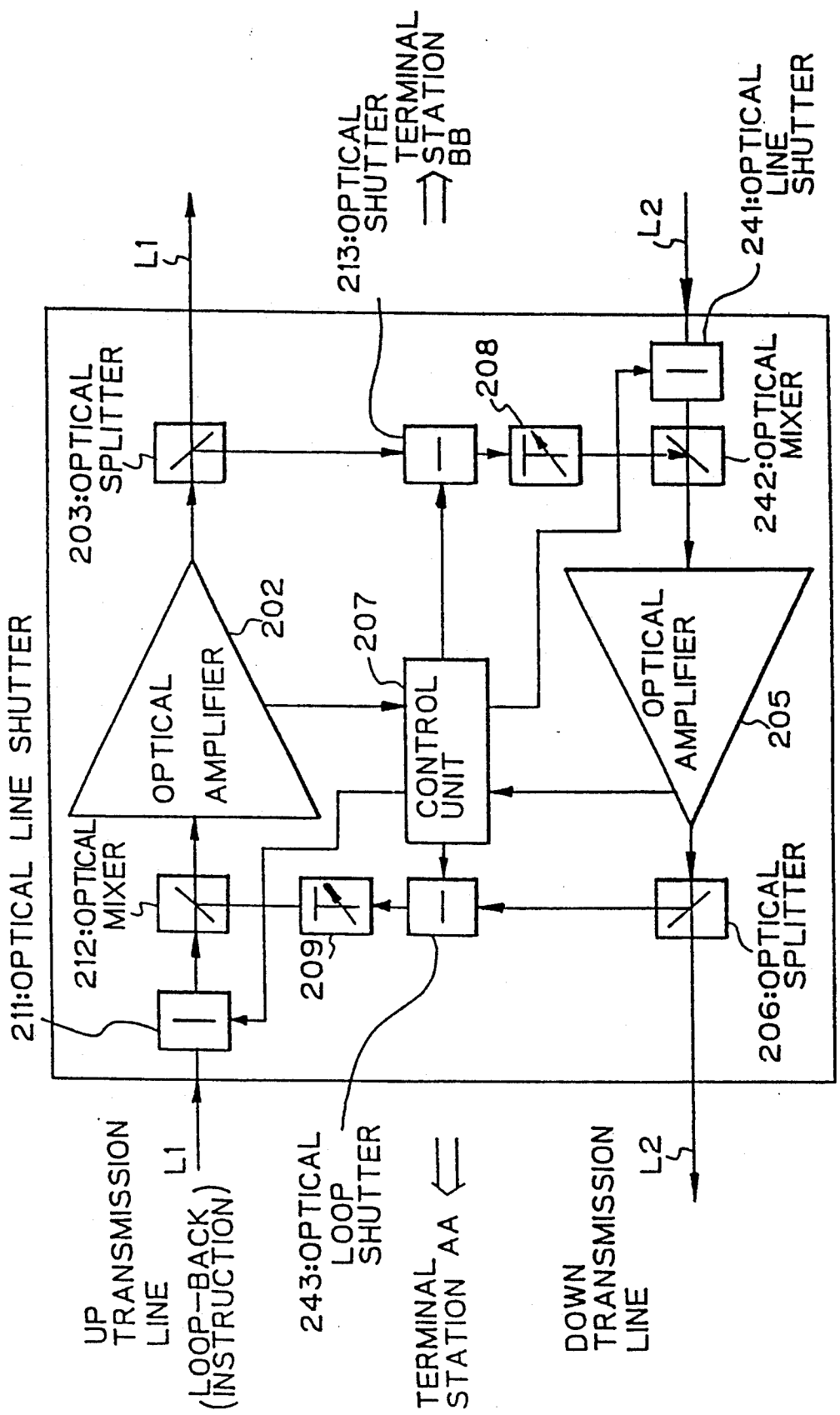
FIG. 5 is a block diagram showing a principle configuration of an optical repeater according to a second embodiment of the present invention.

FIG. 5 is a block diagram showing a principle configuration of an optical repeater according to a second embodiment of the present invention.

As shown in FIG. 5, an optical repeater according to the second embodiment of the present invention comprises optical line shutters 211, 241, optical mixers 212, 242, optical amplifiers 202, 205, optical splitters 203, 206, optical loop shutters 213, 243, control unit 207, and optical attenuators 208, 209. The optical line shutter 211, the optical mixer 212, the optical amplifier 202, and the optical splitter 203 are provided in series along the optical direction of an up transmission line L1. Similarly, the optical line shutter 241, the optical mixer 242, the optical amplifier 205, and the optical splitter 206 are provided in series along the optical direction of a down transmission line L2. The optical control unit 207 is used to detect a loop-back instruction from one terminal station (for example, terminal station AA) through one of the optical amplifiers 202, to open one optical line shutter 211 of one transmission line L1 as a normal state and close the other optical line shutter 241 of the other transmission line L2, and to open one optical loop shutter 213 as a normal state and close the other optical loop shutter 243, so that a loop-back line is constituted.

In the optical repeater according to the second embodiment of the present invention shown in FIG. 5, when a loop-back instruction is transferred through the up transmission line L1 from the terminal station AA, the loop-back instruction is detected by the control unit 207 through the optical line shutter 211, the optical mixer 212, and the optical amplifier 202. The optical line shutter 211 is controlled to pass through optical signals from the terminal station AA to the optical amplifier 202 as a normal state, and the optical line shutter 241 is controlled to cut optical signals from the terminal station BB to avoid a mixing thereby with the loop-back signal. Further, the optical loop shutter 213 is controlled to pass through optical signals from the optical splitter 203 to the optical mixer 242 as a loop-back state, and the optical loop shutter 243 is controlled to cut optical signals from the optical splitter 206 to avoid a return and mixing of the optical signals with the loop-back signal.

Namely, when the loop-back instruction is output from the terminal station AA through the up transmission line L1, the loop-back line is constituted by the optical line shutter 211→the optical mixer 212→the optical amplifier 202→the optical splitter 203→the optical loop shutter 213→the optical mixer 242→the optical amplifier 205→the optical splitter 206, and the loop-back signal (return signal) is returned to the terminal station AA through the down transmission line L2. The optical attenuator 208 can be provided between the optical loop shutter 213 and the optical mixer 242.

Similarly, when a loop-back instruction is transferred through the down transmission line L2 from the terminal station BB, the loop-back instruction is detected by the control unit 207 through the optical line shutter 241, the optical mixer 242, and the optical amplifier 205. The optical line shutter 241 is controlled to pass through optical signals from the terminal station BB to the optical amplifier 205 as a normal state, and the optical line shutter 211 is controlled to cut optical signals from the terminal station AA to avoid to be mixed with loop-back signal. Further, the optical loop shutter 243 is controlled to pass through optical signals from the optical splitter 206 to the optical mixer 212 as a loop-back state, and the optical loop shutter 213 is controlled to cut optical signals from the optical splitter 203, to avoid a return and mixing of the optical signal with the loop-back signal.

When the loop-back instruction is output from the terminal station BB through the down transmission line L2, the loop-back line is constituted by the optical line shutter 241→the optical mixer 242→the optical amplifier 205→the optical splitter 206→the optical loop shutter 243→the optical mixer 212→the optical amplifier 202→the optical splitter 203, and the loop-back signal (return signal) is returned to the terminal station BB through the up transmission line L1. The optical attenuator 209 can be provided between the optical loop shutter 243 and the optical mixer 212.

In the above optical repeater according to the second embodiment of the present invention, the optical amplifiers 202 and 205 have the same construction as the optical amplifiers 102 and 105 of the optical repeater according to the first embodiment of the present invention.

In accordance with the first and second embodiment of the present invention as described above, an optical loop-back operation can be carried out in an optical repeater using an optical direct amplifying method without mixing the loop-back signal with optical signals of the opposite transmission line, and thus an exact supervision of an optical repeater can be realized.

Figure 6:
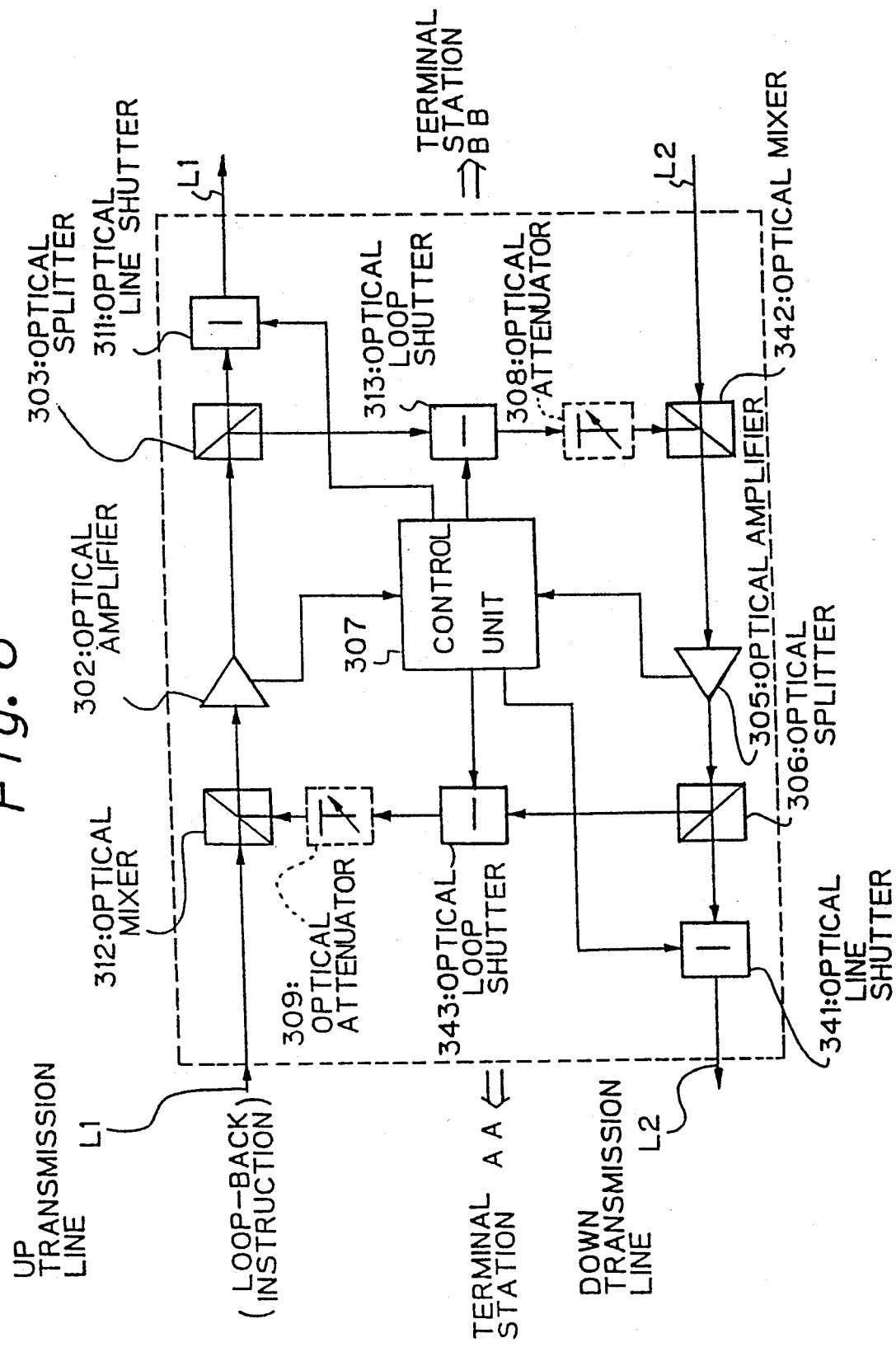
FIG. 6 is a block diagram showing a principle configuration of an optical repeater according to a third embodiment of the present invention.

FIG. 6 is a block diagram showing a principle configuration of an optical repeater according to a third embodiment of the present invention.

As shown in FIG. 6, an optical repeater according to a third embodiment of the present invention comprises optical mixers 312, 342, optical amplifiers 302, 305, optical splitters 303, 306, optical line shutters 311, 341, optical loop shutters 313, 343, control unit 307, and optical attenuators 308, 309. The optical mixer 312, the optical amplifier 302, the optical splitter 303, and the optical line shutter 311 are provided in series along the optical direction of an up transmission line L1. Similarly, the optical mixer 342, the optical amplifier 305, the optical splitter 306, and the optical line shutter 341 are provided in series along the optical direction of a down transmission line L2.

The optical control unit 307 is used to detect a loop-back instruction from one terminal station (for example, terminal station AA) through one optical amplifier 302, to close one optical line shutter 311 of one transmission line L1 as a loop-back state and open the other optical line shutter 341 of the other transmission line L2 as a normal state, and to open one optical loop shutter 313 as a loop-back state and close the other optical loop shutter 343 as a normal state, so that a loop-back line is constituted. In this optical repeater according to the third embodiment of the present invention, when the loop-back operation is carried out in the specific optical repeater ($REP_n$), the up direction optical repeater ($REP_{n+1}$, $REP_{n+2}$, ... ) located in the up direction of the specific optical repeater ($REP_n$) is also controlled to cut optical signals of the up direction optical repeater ($REP_{n+1}$, $REP_{n+2}$, ... ) by an output-cut instruction output from the terminal station AA.

In the above description, the loop-back instruction and the output-cut instruction are output from the terminal station AA through the up transmission line L1 to carry out a loop-back operation from the terminal station AA, but these loop-back instruction and output-cut instruction can be also output from the terminal station BB through the down transmission line L2, to carry out a loop-back operation from the terminal station BB.

In the optical repeater according to the third embodiment of the present invention shown in FIG. 6, when a loop-back instruction is transferred through the up transmission line L1 from a terminal station AA, the loop-back instruction is detected by the control unit 307 through the optical mixer 312 and the optical amplifier 302, and then the optical loop shutter 343 is maintained closed as a normal state, the other optical loop shutter 313 is opened and changed to a loop-back state, so that a loop-back line is constituted. When the loop-back operation is completed, a loop-back finish instruction is transferred from the terminal station from which the loop-back instruction is transferred, and then the optical line shutters 311, 341 and optical loop shutters 313, 343 are returned to the normal state.

Namely, when the loop-back instruction is output from the terminal station AA through the up transmission line L1, the loop-back line is constituted by the optical mixer 312→the optical amplifier 302→the optical splitter 303→the optical loop shutter 313→the optical mixer 342→the optical amplifier 305→optical splitter 306→the optical line shutter 341, and a loop-back signal is returned to the terminal station AA through the down transmission line L2. The optical attenuator 308 can be provided between the optical line shutter 313 and the optical mixer 342.

The optical line shutter 341 in this optical repeater (REP$_n$) carrying out the loop-back operation is maintained in the open state, but the optical line shutter 341 in the up direction optical repeater (for example, REP$_{n+1}$) receiving an output-cut instruction from the terminal station AA is changed to a closed state. Namely, in the optical repeater according to the third embodiment of the present invention, when the loop-back operation is carried out in the specific optical repeater (REP$_n$), the up direction optical repeater (REP$_{n+1}$, REP$_{n+2}$...) located upstream of the specific optical repeater (REP$_n$) is also controlled to cut optical signals of the up direction optical repeater (REP$_{n+1}$, REP$_{n+2}$, ...) by an output-cut instruction output from the terminal station AA.

Similarly, when a loop-back instruction is transferred through the down transmission line L2 from the terminal station BB, the loop-back instruction is detected by the control unit 307 through the optical mixer 342 and the optical amplifier 305, and then the optical loop shutter 313 is maintained closed as a normal state, the other optical loop shutter 343 is opened and changed to a loop-back state, so that a loop-back line is constituted.

When the loop-back instruction is output from the terminal station BB through the down transmission line L2, the loop-back line is constituted by the optical mixer 342→the optical amplifier 305→the optical splitter 306→the optical loop shutter 343→the optical mixer 312→the optical amplifier 302→the optical splitter 303→the optical line shutter 311, and a loop-back signal is returned to the terminal station BB through the up transmission line L1. The optical attenuator 309 can be provided between the optical line shutter 343 and the optical mixer 312.

When the right adjacent optical repeater (REP$_{n+1}$) is used to carry out the loop-back operation by receiving the loop-back instruction from the terminal station BB and the up direction (upstream) optical repeater (REP$_n$) receiving the output-cut instruction from the terminal station BB, the optical line shutter 311 of the upstream optical repeater (REP$_n$) is closed and the optical output signals are not transferred to the right adjacent optical repeater (REP$_{n+1}$), so that the loop-back signals are not mixed with the optical signals output from the upstream optical repeater.

Figure 7:
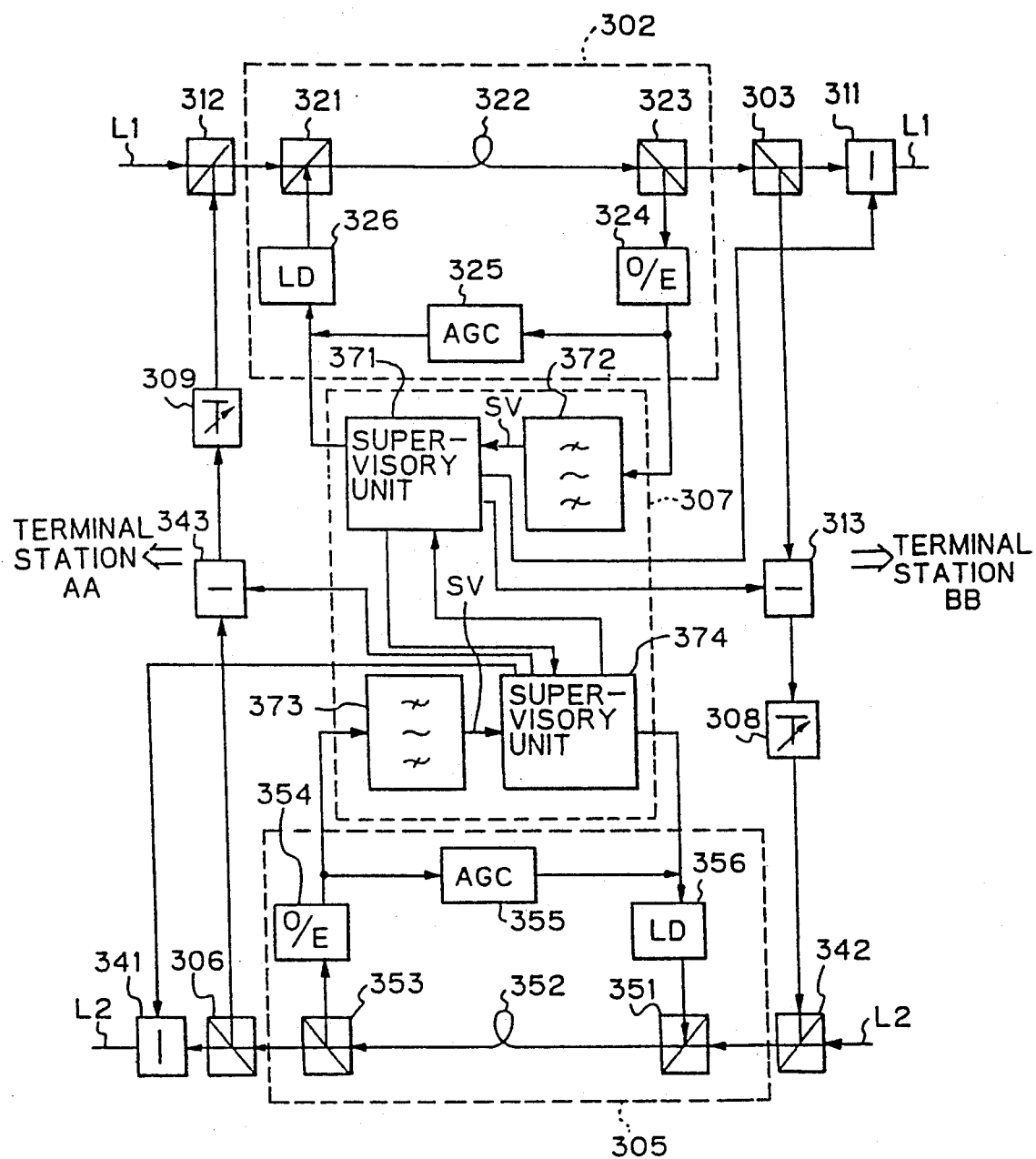
FIG. 7 is a block diagram of the optical repeater according to the third embodiment of the present invention.

FIG. 7 is a block diagram of the optical repeater according to the third embodiment of the present invention.

As shown in FIG. 7, in this embodiment, each of the optical amplifiers 302 (305) is constituted by an optical mixer (photocoupler) 321 (351), erbium-doped optical fibers (EDF) 322 (352), an optical splitter (beam splitter) 323 (353), an opto-electrical conversion unit (photo diode) 324 (354), an auto gain control (AGC) circuit 325 (355), and a laser diode (LD) 326 (356).

The optical mixers 321, 351 are used to add pump light to optical signals from optical mixers 312, 342, and optical splitters 323, 353 are used to branch optical signals from the fibers (EDF) 322, 352. The opto-electrical conversion units (O/E) 324, 354, which are constituted by photo diodes, are used to convert optical signals to electrical signals, and the AGC circuits 325, 355 are used to automatically control the gain of signals output from the opto-electrical conversion units 324, 354. The laser diodes (LD) 326, 356 are used to generate the pump light in accordance with electrical output signals of the AGC circuits 325, 355.

The control unit 307 is constituted by bandpass filters 372, 373, and supervisory units (SV) 371, 374. The bandpass filters 372, 373 are used to pick up supervisory signals SV from electrical signals output from the opto-electrical conversion units 324, 354, and the supervisory units 371, 374 are used to amplitude-modulate optical output of the laser diode 326, 356 by receiving the supervisory signals SV from the bandpass filters 372, 373. The supervisory units 371 and 374 are interconnected, and one supervisory unit 371 controls the optical line shutter 311 and the optical loop shutter 313, and the other supervisory unit 374 controls the optical line shutter 341 and the optical loop shutter 343.

As described above, the configurations of the optical amplifiers 302 and 305 are the same as those shown in FIG. 3 in the optical repeater according to the first embodiment of the present invention.

For example, in a normal operation of an up transmission line L1 of the above described optical repeater, optical signals output from the terminal station AA are directly amplified by pumping in the optical mixers 321 through the optical mixer 312 connecting to the up transmission line L1, and the amplified optical signals are output to the terminal station BB through the optical splitter 323, the optical splitter 303, the optical line shutter 311, and the up transmission line L1. Note, in this case, the optical signals are branched by the optical splitter 323 and converted to electrical signals by the opto-electrical conversion unit 324, and then the signals are supplied to the laser diode 326 which is an electro-optical conversion unit, by carrying out the automatic gain control of the AGC circuit 325, so that output signals of the AGC circuit 325, or output signals of the optical repeater are maintained at a constant level.

The electrical signals output from the opto-electrical conversion unit 324 are also supplied to the bandpass filter 372, and the supervisory signals SV are divided from the electrical signals and transferred to the supervisory unit 371. Note, some supervisory signals of the supervisory unit 371 are transferred to the other supervisory unit 374, which monitors the opposite transmission line (or down transmission line L2). Further, some supervisory signals are transferred from the supervisory unit 374 to the supervisory unit 371, to control the laser diode 326.

As described above, input of the laser diode 326 is defined as the signals mixed by the outputs of the AGC circuit 325 and the supervisory unit 371, the output of the AGC circuit 325 is maintained at a constant level, and the supervisory signals SV output from the supervisory unit 371 are specified as the shape of the constant output of the AGC circuit 325 amplitude-modulated by the supervisory signals SV of the supervisory unit 371. For example, as described above, the optical signals from the terminal station AA (BB) to the terminal station BB (AA) for transferring communication data, or carrying out an optical communication are specified as 10 Gbit/sec., or 10 GHz, and the supervisory signals SV, which may be amplitude-modulated and carried by the optical signals output from the terminal station, are specified as about 10 MHz. The frequency of the supervisory signals SV is much lower than that of the optical signals output from the terminal station, and thus the supervisory signals SV can be divided from the electrical signals output from the opto-electrical conversion unit 324 (354) by using only a band pass filter 372 (373). Therefore, the circuit configuration of the control unit 307 can be simplified, and a circuit scale thereof made smaller.

Figure 8:
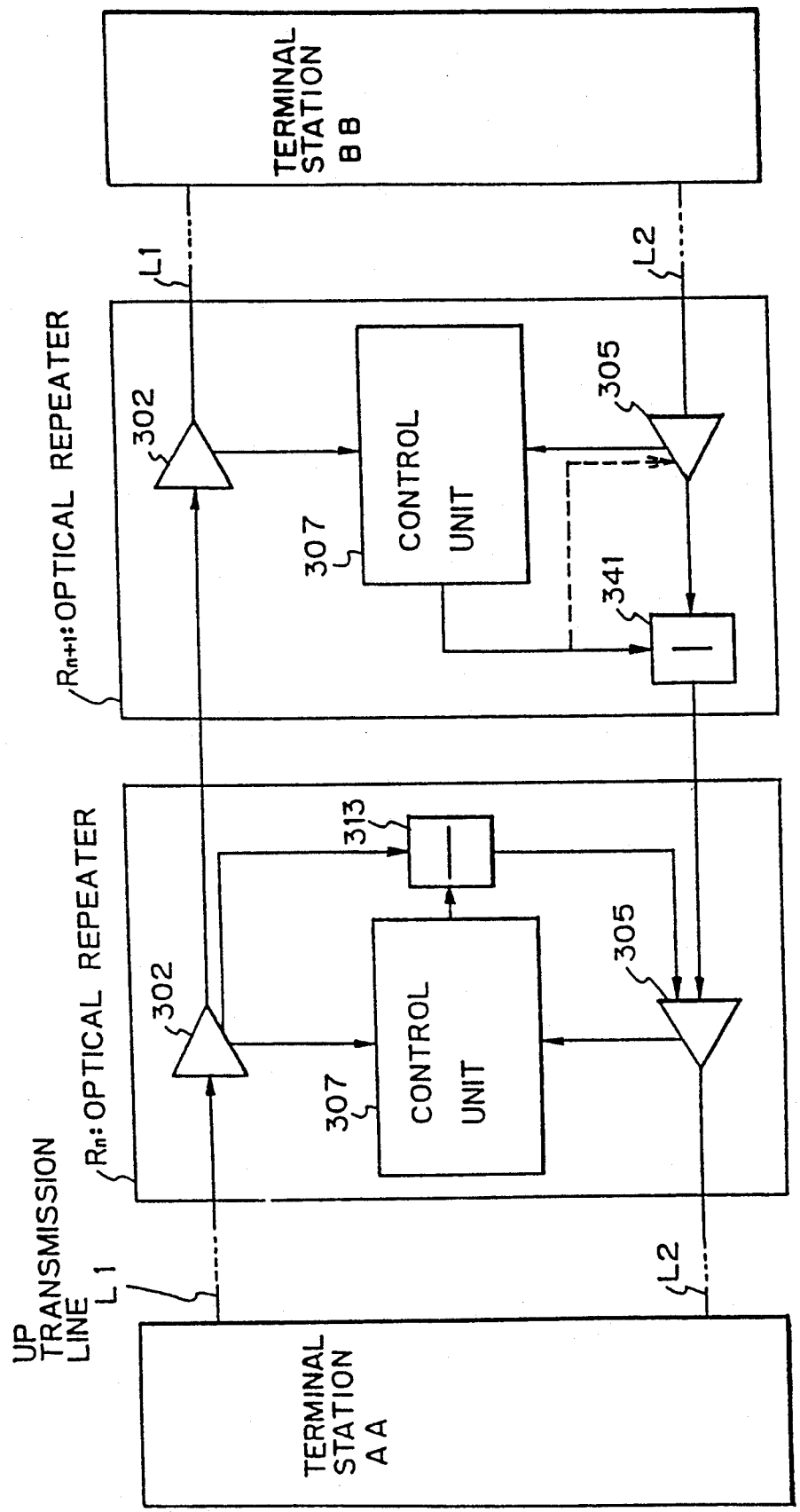
FIG. 8 is a schematic block diagram for explaining a loop-back operation applied in a transmission system using the optical repeaters shown in FIG. 7.

FIG. 8 is a schematic block diagram for explaining a loop-back operation applied in a transmission system using the optical repeaters shown in FIG. 7.

In the above described optical repeater, for example, when a loop-back instruction is transferred from the terminal station AA to a specific optical repeater ($R_n$), the loop-back instruction is detected by the supervisory units 371 and 374 from the supervisory signals SV, the optical line shutter 311 is closed to form a loop-back state, the optical line shutter 341 is maintained open as a normal state, the optical loop shutter 343 is maintained closed as a normal state, and the optical loop shutter 313 is opened as a loop-back state. Therefore, a loop-back line is constituted by the optical mixer 312→the optical amplifier 302→the optical splitter 303→the optical loop shutter 313→the optical mixer 342→the optical amplifier 305→the optical splitter 306→the optical line shutter 341, and a loop-back signal is returned to the terminal station AA through the down transmission line L2.

As shown in FIG. 8, the optical line shutter 341 in the up direction optical repeater ($REP_{n+1}$) receiving an output-cut instruction from the terminal station AA is closed as a loop-back state to cut optical signals. Namely, when the specific optical repeater $R_n$ carrying out the loop-back operation by the loop-back instruction from the terminal station AA, the output-cut instruction is transferred from the terminal station AA to the up direction (upstream) optical repeater (for example, a right adjacent optical repeater $R_{n+1}$ to the specific optical repeater $R_n$), and the optical line shutter 341 in the up direction optical repeater ($REP_{n+1}$) is closed. Therefore, the loop-back signals returned from the specific optical repeater $R_n$ are not mixed with the optical signals output from the upstream optical repeater $REP_{n+1}$. In this case, the optical signals can be cut by another upstream (up direction) optical repeater $REP_{n+2}$, $REP_{n+3}$, . . . .

Figure 9:
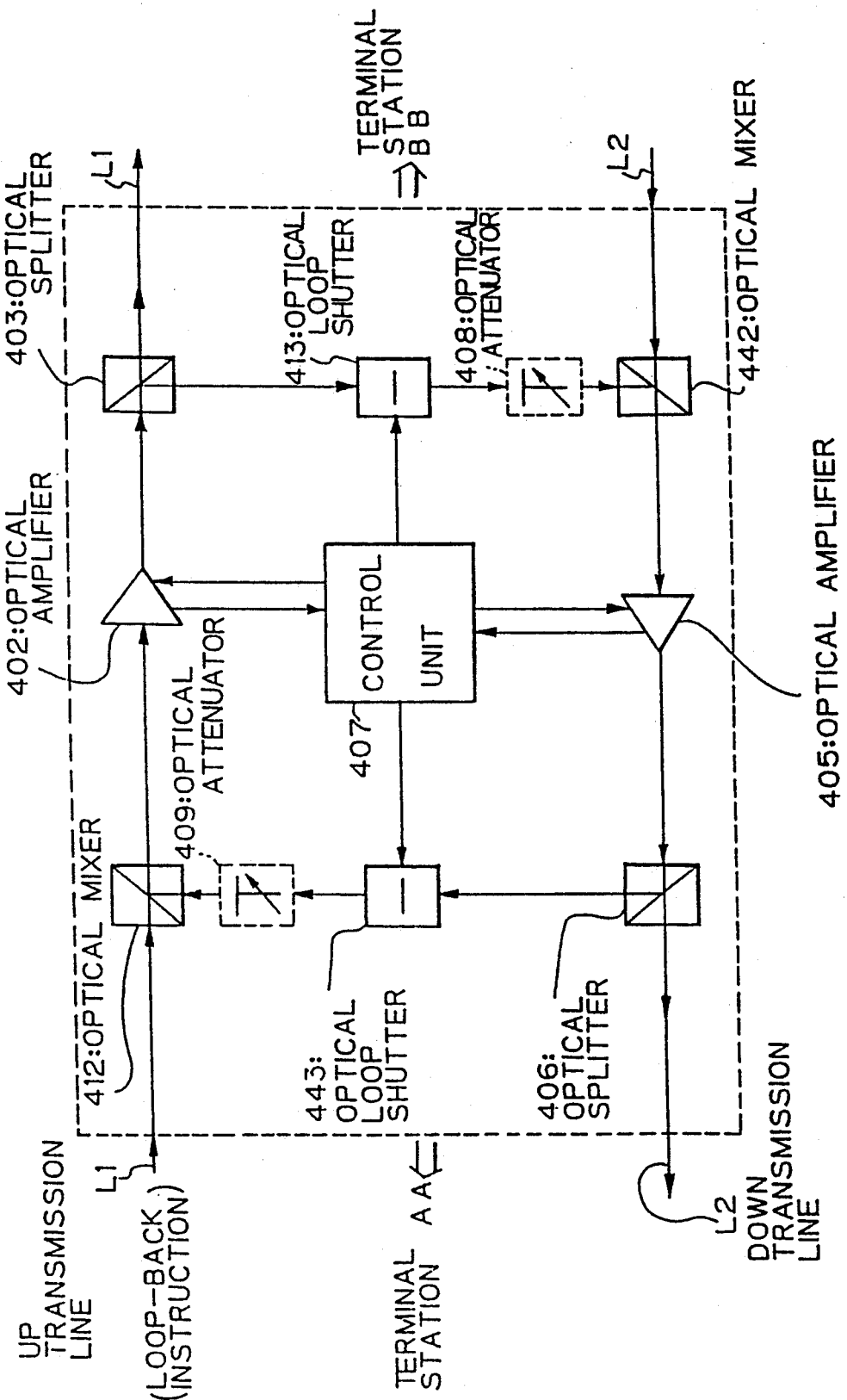
FIG. 9 is a block diagram showing a principle configuration of an optical repeater according to a fourth embodiment of the present invention.
Figure 10:
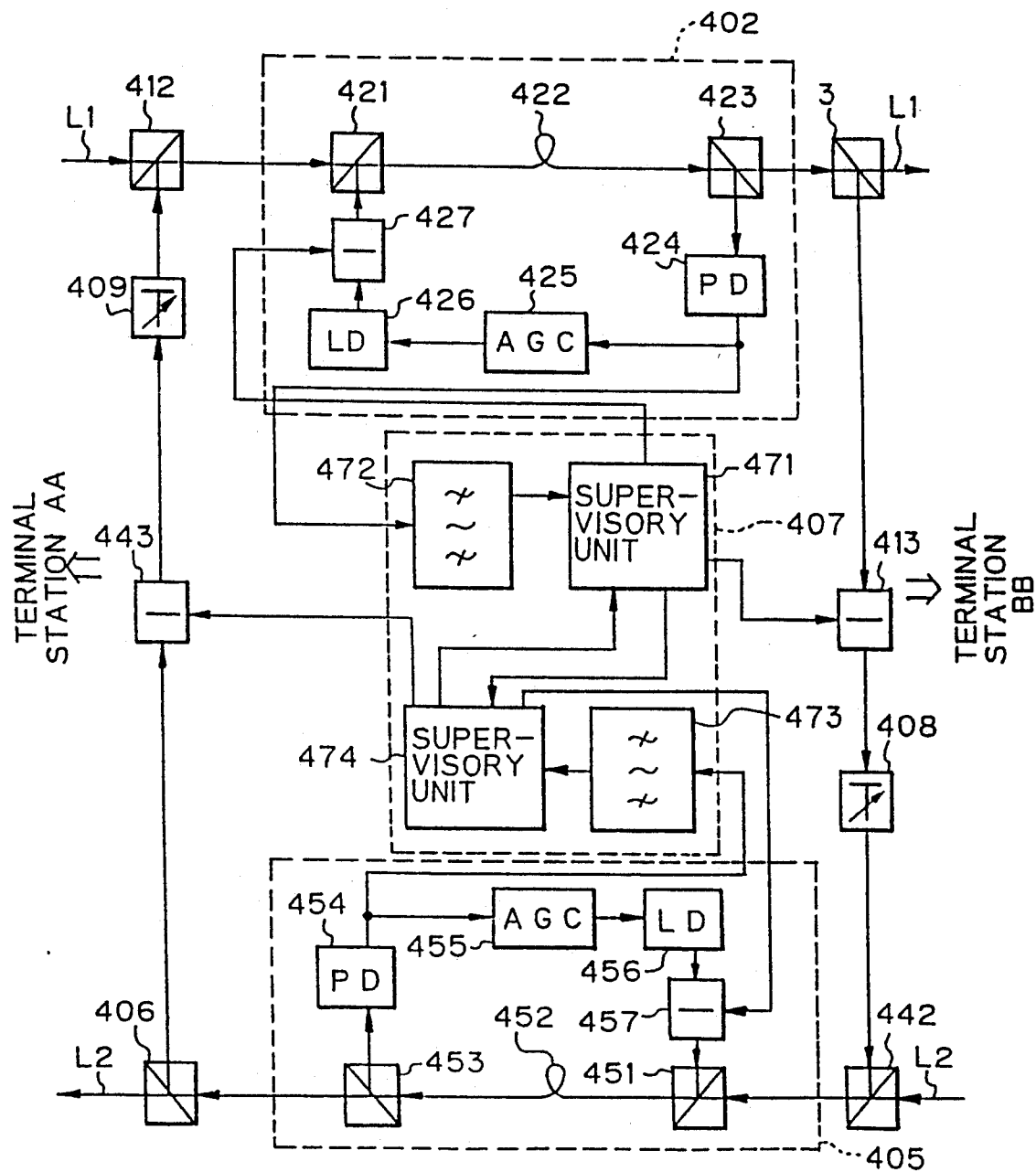
FIG. 10 is a block diagram of the optical repeater according to the fourth embodiment of the present invention.

FIG. 9 is a block diagram showing a principle configuration of an optical repeater according to a fourth embodiment of the present invention, and FIG. 10 is a block diagram of the optical repeater according to the fourth embodiment of the present invention.

As shown in FIG. 9, an optical repeater according to a fourth embodiment of the present invention comprises optical mixers 412, 442, optical amplifiers 402, 405, optical splitters 403, 406, optical loop shutters 413, 443, control unit 407, and optical attenuators 408, 409. The optical mixer 412, the optical amplifier 402, and the optical splitter 403 are provided in series along optical direction of an up transmission line L1, similarly, the optical mixer 442, the optical amplifier 405, and the optical splitter 406 are provided in series along optical direction of a down transmission line L2. The configuration of the optical repeater according to the fourth embodiment of the present invention is similar to that of the third embodiment of the present invention shown in FIGS. 6 and 7.

First, by comparing the optical repeater shown in FIG. 9 with that shown in FIG. 6, it is clear that the optical line shutters 311 and 341 are omitted from the optical repeater shown in FIG. 6. In a comparison with the optical amplifier 402 (405) shown in FIG. 10 with that shown in FIG. 7, an optical line shutter 427 (457) is added to the optical amplifier 302 (305) shown in FIG. 7.

Similarly to the optical repeater according to the third embodiment of the present invention, in the optical repeater of the fourth embodiment, when the loop-back operation is carried out in the specific optical repeater ($REP_n$), the up direction optical repeater ($REP_{n+1}$, $REP_{n+2}$, . . . ) located upstream of the specific optical repeater ($REP_n$) is also controlled to cut optical signals of the up direction optical repeater ($REP_{n+1}$, $REP_{n+2}$, . . . ) by an output-cut instruction output from the terminal station AA.

In the above description, the loop-back instruction and the output-cut instruction are output from the terminal station AA through the up transmission line L1 to carry out a loop-back operation from the terminal station AA, but the loop-back instruction and output-cut instruction can be also output from the terminal station BB through the down transmission line L2 to carry out a loop-back operation from the terminal station BB.

In the optical repeater shown in FIG. 9, when a loop-back instruction is transferred through the up transmission line L1 from a terminal station AA, the loop-back instruction is detected by the control unit 407 through the optical mixer 412 and the optical amplifier 402, and then the optical loop shutter 443 is maintained closed as a normal state, and the other optical loop shutter 413 is opened as a loop-back state, so that a loop-back line is constituted. When the loop-back operation is completed, a loop-back finish instruction is transferred from the terminal station from which the loop-back instruction is transferred, and then the optical loop shutters 413, 443 and optical shutters 427, 457 of the optical amplifiers 402, 405 are returned to the normal state.

Namely, when the loop-back instruction is output from the terminal station AA through the up transmission line L1, the loop-back line is constituted by the optical mixer 412→the optical amplifier 402→the optical splitter 403→the optical loop shutter 413→the optical mixer 442→the optical amplifier 405→the optical splitter 406, and a loop-back signal is returned to the terminal station AA through the down transmission line L2. The optical attenuator 408 can be provided between the optical line shutter 413 and the optical mixer 442.

As shown in FIG. 10, optical loop shutters 427 and 457 of the optical amplifiers 402 and 405 in this optical repeater ($REP_n0$) carrying out the loop-back operation are maintained open as a normal state, but the optical line shutter 457 of the optical amplifier 405 in the up direction optical repeater (for example, $REP_{n+1}$) receiving an output-cut instruction from the terminal station AA is closed as a loop-back state (or output cut state). Namely, in the optical repeater according to the fourth aspect of the present invention, when the loop-back operation is carried out in the specific optical repeater (REP$_n$), the up direction optical repeater (REP$_{n+1}$, REP$_{n+2}$, ...) located in the up direction of the specific optical repeater (REP$_n$) is also controlled to cut optical signals of the up direction optical repeater (REP$_{n+1}$, REP$_{n+2}$, ...) by an output-cut instruction output from the terminal station AA.

Similarly, when a loop-back instruction is transferred through the down transmission line L2 from the terminal station BB, the loop-back instruction is detected by the control unit 407 through the optical mixer 442 and the optical amplifier 405, and then the optical loop shutter 413 is maintained to close as a normal state, and the other optical loop shutter 443 is opened as a loop-back state, so that a loop-back line is constituted.

When the loop-back instruction is output from the terminal station BB through the down transmission line L2, the loop-back line is constituted by the optical mixer 442→the optical amplifier 405→the optical splitter 406→the optical loop shutter 443→the optical mixer 412→the optical amplifier 402→the optical splitter 403, and a loop-back signal is returned to the terminal station BB through the up transmission line L1. The optical attenuator 409 can be provided between the optical line shutter 443 and the optical mixer 312.

When the right adjacent optical repeater (REP$_{n+1}$) is used to carry out the loop-back operation by receiving the loop-back instruction from the terminal station BB and the up direction (upstream) optical repeater (REP$_n$) receiving the output-cut instruction from the terminal station BB, the optical loop shutter 427 of the upstream optical repeater (REP$_n$) is closed and the optical output signals are not pumped, and thus the optical signals are not supplied to the right adjacent optical repeater (REP$_{n+1}$), so that the loop-back signals are not mixed with the optical signals output from the upstream optical repeater.

In the optical repeater according to the fourth embodiment of the present invention, the terminal station outputs an output-cut instruction to the upstream optical repeater for cutting the output signals of the upstream optical repeater, to avoid a mixing of the loop-back signals and the optical signals output from the upstream optical repeater. Further, in FIG. 10, the output-cut instruction is also realized by cutting the outputs of the laser diodes 426, 456 of light sources for a pumping operation by controlling the AGC circuits 425, 455 from the supervisory units 471, 474, instead of closing the optical loop shutters 427, 457. In addition, in the above embodiment, the optical attenuators 408, 409 are connected after the optical loop shutters 413, 443 to be brought to control at a normal light level, but the optical attenuators can be also provided before the optical loop shutters 413, 443 to be brought to control at the normal light level.

In the above description, in a loop-back operation using the above optical repeaters of the third and the fourth embodiment of the present invention, a loop-back instruction is transferred by supervisory signals including a frequency assigned for each of the optical repeaters from the terminal station (AA, BB) to the specific optical repeater (R$_n$). Further, an output-cut instruction is also transferred by supervisory signals including a frequency assigned for each of the optical repeaters from the terminal station to an upstream (up direction) optical repeater (R$_{n+1}$) which is located adjacent to and upstream of the specific optical repeater (R$_n$).

For example, the supervisory signals including assigned frequency for each optical repeater are continuously transferred from the terminal station, and when stopping the transfer of the supervisory signals, a loop-back instruction or an output-cut instruction is set to the specific optical repeater (R$_n$) and the upstream optical repeater (R$_{n+1}$). Namely, the supervisory signals SV detected by the supervisory units 371, 374 (471, 474) are multiplexed in different frequency for each optical repeater, and instruction codes of the supervisory signals are decoded by the supervisory units 371, 374 (471, 474) to discriminate whether the instruction codes indicate the loop-back instruction or the output-cut instruction. In this case, the supervisory signals SV can be continuously transferred from the terminal station, and the loop-back instruction or the output-cut instruction can be set when stopping the transfer of the supervisory signals.

As described above, an optical repeater is switched to a loop-back mode or an output-cut mode by supervisory signals SV which are output from a terminal station, and an optical loop-back operation can be carried out without mixing the optical loop-back signals with optical signals of the opposite transmission line, in the optical repeater using an optical direct amplification method, and thus a correct supervision of the optical repeater can be realized.

Many widely differing embodiments of the present invention may be constructed without departing from the spirit and scope of the present invention, and it should be understood that the present invention is not limited to the specific embodiments described in this specification, except as defined in the appended claims.

We claim:

1. An optical repeater having a loop-back function used in a transmission system including first and second transmission lines, comprising:

a first optical amplifier, connected to said first transmission line, for directly amplifying optical signals transferred from a first terminal station through said first transmission line;

a second optical amplifier, connected to said second transmission line, for directly amplifying optical signals transferred from a second terminal station through said second transmission line;

a loop-back means, connected to said first and second transmission lines, for constituting a loop-back line;

a control means, connected to said first and second amplifiers and said loop-back means, for controlling said loop-back means to constitute the loop-back line when detecting a loop-back instruction output from one of said terminal stations through a corresponding one of said optical amplifiers, said loop back means comprising first and second optical switches and first and second optical splitters; said first optical switch, said first optical amplifier, and said first optical splitter being provided in series along said first transmission line, and said second optical switch, said second optical amplifier, and said second optical splitter being provided in series along said second transmission line; and a first optical attenuator provided between said first optical splitter and said second optical switch, and a second optical attenuator provided between said second optical splitter and said first optical switch.

2. An optical repeater as claimed in claim 1, wherein said control means switches one of said optical switches to a normal state and switches the other of said optical switches to a loop-back state, to thereby constitute the loop-back line, when a loop-back instruction is detected by said control means.

3. An optical repeater as claimed in claim 2, wherein said loop-back line is constituted by said first optical switch, said first optical amplifier, said first optical splitter, said second optical switch, said second optical amplifier, and said second optical splitter, when the loop-back instruction is transferred from said first terminal station through said first transmission line.

4. An optical repeater as claimed in claim 2, wherein said loop-back line is constituted by said second optical switch, said second optical amplifier, said second optical splitter, said first optical switch, said first optical amplifier, and said first optical splitter, when the loop-back instruction is transferred from said second terminal station through said second transmission line.

5. An optical repeater as claimed in claim 1, wherein said transmission system is a submarine optical cable communication system.

6. An optical repeater having a loop-back function used in a transmission system including first and second transmission lines, comprising:
   a first optical amplifier, connected to said first transmission line, for directly amplifying optical signals transferred from a first terminal station through said first transmission line;
   a second optical amplifier, connected to said second transmission line, for directly amplifying optical signals transferred from a second terminal station through said second transmission line;
   a loop-back means, connected to said first and second transmission lines, for constituting a loop-back line; and
   a control means, connected to said first and second amplifiers and said loop-back means, for controlling said loop-back means to constitute the loop-back line when detecting a loop-back instruction output from one of said terminal stations through a corresponding one of said optical amplifiers,
   wherein said loop back means comprises first and second optical line shutters, first and second optical mixers, first and second optical loop shutters, and first and second optical splitters; and wherein said first optical line shutter, said first optical mixer, said first optical amplifier, and said first optical splitter are provided in series along said first transmission line, and said second optical line shutter, said second optical mixer, said second optical amplifier, and said second optical splitter are provided in series along said second transmission line.

7. An optical repeater as claimed in claim 6, wherein said control means opens one of said optical line shutters as a normal state and closes the other of said optical line shutters as a loop-back state, and opens one of said optical loop shutters as the loop-back state and closes the other of said optical loop shutters as the normal state, to thereby constitute the loop-back line, when a loop-back instruction is detected by said control means.

8. An optical repeater as claimed in claim 7, wherein said loop-back line is constituted by said first optical line shutter, said first optical mixer, said first optical amplifier, said first optical splitter, said first optical loop shutter, said second optical mixer, said second optical amplifier, and said second optical splitter, when the loop-back instruction is transferred from said first terminal station through said first transmission line.

9. An optical repeater as claimed in claim 7, wherein said loop-back line is constituted by said second optical line shutter, said second optical mixer, said second optical amplifier, said second optical splitter, said second optical loop shutter, said first optical mixer, said first optical amplifier, and said first optical splitter, when the loop-back instruction is transferred from said second terminal station through said second transmission line.

10. An optical repeater as claimed in claim 6, wherein said optical repeater further comprises a first optical attenuator provided between said first optical loop shutter and said second optical mixer, and a second optical attenuator provided between said second optical loop shutter and said first optical mixer.

11. An optical repeater having a loop-back function used in a transmission system including first and second transmission lines, comprising:
   a first optical amplifier, connected to said first transmission line, for directly amplifying optical signals transferred from a first terminal station through said first transmission line;
   a second optical amplifier, connected to said second transmission line, for directly amplifying optical signals transferred from a second terminal station through said second transmission line;
   a loop-back means, connected to said first and second transmission lines, for constituting a loop-back line; and
   a control means, connected to said first and second amplifiers and said loop-back means, for controlling said loop-back means to constitute the loop-back line when detecting a loop-back instruction output from one of said terminal stations through a corresponding one of said optical amplifiers,
   wherein said loop back means comprises first and second optical line shutters, first and second optical mixers, first and second optical loop shutters, and first and second optical splitters; and wherein said first optical mixer, said first optical amplifier, said first optical splitter, and said first optical line shutter are provided in series along said first transmission line, and said second optical mixer, said second optical amplifier, said second optical splitter, and said second optical line shutter are provided in series along said second transmission line.

12. An optical repeater as claimed in claim 11, wherein said control means closes one of said optical line shutters as a loop-back state and opens the other of said optical line shutters as a normal state, and opens one of said optical loop shutters as the loop-back state and closes the other of said optical loop shutters as the normal state, to thereby constitute the loop-back line, when the loop-back instruction is detected by said control means.

13. An optical repeater as claimed in claim 12, wherein said loop-back line is constituted by said first optical mixer, said first optical amplifier, said first optical splitter, said first optical loop shutter, said second optical mixer, said second optical amplifier, said second optical splitter, and said second optical line shutter, when the loop-back instruction is transferred from said first terminal station through said first transmission line.

14. An optical repeater as claimed in claim 12, wherein said loop-back line is constituted by said second optical mixer, said second optical amplifier, said second optical splitter, said second optical loop shutter, said first optical mixer, said first optical amplifier, said first optical splitter, and said first optical line shutter, when the loop-back instruction is transferred from said second terminal station through said second transmission line.

15. An optical repeater as claimed in claim 11, wherein said optical repeater further comprises a first optical attenuator provided between said first optical loop shutter and said second optical mixer, and a second optical attenuator provided between said second optical loop shutter and said first optical mixer.

16. An optical repeater as claimed in claim 11, wherein a loop-back operation is carried out in the transmission system in a specific optical repeater by the loop-back instruction output from one of said terminal stations, and an up direction optical repeater is provided located upstream of said specific optical repeater, said up direction optical repeater being controlled to cut optical signals by an output-cut instruction output from said one of said terminal stations.

17. An optical repeater having a loop-back function used in a transmission system including first and second transmission lines, comprising:
   a first optical amplifier, connected to said first transmission line, for directly amplifying optical signals transferred from a first terminal station through said first transmission line;
   a second optical amplifier, connected to said second transmission line, for directly amplifying optical signals transferred from a second terminal station through said second transmission line;
   a loop-back means, connected to said first and second transmission lines, for constituting a loop-back line; and
   a control means, connected to said first and second amplifiers and said loop-back means, for controlling said loop-back means to constitute the loop-back line when detecting a loop-back instruction output from one of said terminal stations through a corresponding one of said optical amplifiers,
   wherein said loop back means comprises first and second optical mixers, first and second optical splitters, and first and second optical loop shutters; wherein said first optical mixer, said first optical amplifier, and said first optical splitter are provided in series along said first transmission line, and said second optical mixer, said second optical amplifier, and said second optical splitter are provided in series along said second transmission line.

18. An optical repeater as claimed in claim 17, wherein said control means opens one of said optical loop shutters as a loop-back state and closes the other of said optical loop shutters as a normal state, to thereby constitute the loop-back line, when a loop-back instruction is detected by said control means.

19. An optical repeater as claimed in claim 18, wherein said loop-back line is constituted by said first optical mixer, said first optical amplifier, said first optical splitter, said first optical loop shutter, said second optical mixer, said second optical amplifier, and said second optical splitter, when the loop-back instruction is transferred from said first terminal station through said first transmission line.

20. An optical repeater as claimed in claim 18, wherein said loop-back line is constituted by said second optical mixer, said second optical amplifier, said second optical splitter, said second optical loop shutter, said first optical mixer, said first optical amplifier, and said first optical splitter, when the loop-back instruction is transferred from said second terminal station through said second transmission line.

21. An optical repeater as claimed in claim 17, wherein said optical repeater further comprises a first optical attenuator provided between said first optical loop shutter and said second optical mixer, and a second optical attenuator provided between said second optical loop shutter and said first optical mixer.

22. An optical repeater as claimed in claim 17, wherein a loop-back operation is carried out in the transmission system in a specific optical repeater by the loop-back instruction output from one of said terminal stations, an up direction optical repeater is provided located upstream of said specific optical repeater, said up direction optical repeater being controlled to cut optical signals by an output-cut instruction output from said one of said terminal stations.

23. An optical repeater having a loop-back function used in a transmission system including first and second transmission lines, comprising:
   a first optical amplifier, connected to said first transmission line, for directly amplifying optical signals transferred from a first terminal station through said first transmission line;
   a second optical amplifier, connected to said second transmission line, for directly amplifying optical signals transferred from a second terminal station through said second transmission line;
   a loop-back means, connected to said first and second transmission lines, for constituting a loop-back line; and
   a control means, connected to said first and second amplifiers and said loop-back means, for controlling said loop-back means to constitute the loop-back line when detecting a loop-back instruction output from one of said terminal stations through a corresponding one of said optical amplifiers,
   wherein each optical amplifier comprises an optical mixer for adding pump light to the optical signals, erbium-doped optical fibers, an optical splitter for branching the optical signals from said fibers, an opto-electrical conversion unit for converting the optical signals to electrical signals, an auto gain control circuit for automatically controlling the gain of signals output from said opto-electrical conversion unit, and a laser diode for generating the pump light in accordance with electrical output signals of said auto gain control circuit.

24. An optical repeater as claimed in claim 23, wherein said opto-electrical conversion unit is constituted by a photo diode.

25. An optical repeater as claimed in claim 23, wherein said optical amplifier further comprises a first optical shutter provided between said laser diode and said optical mixer, and a second optical shutter provided between said laser diode and said optical mixer.

26. An optical repeater having a loop-back function used in a transmission system including first and second transmission lines, comprising:
   a first optical amplifier, connected to said first transmission line, for directly amplifying optical signals transferred from a first terminal station through said first transmission line;
   a second optical amplifier, connected to said second transmission line, for directly amplifying optical signals transferred from a second terminal station through said second transmission line;

a loop-back means, connected to said first and second transmission lines, for constituting a loop-back line; and a control means, connected to said first and second amplifiers and said loop-back means, for controlling said loop-back means to constitute the loop-back line when detecting a loop-back instruction output from one of said terminal stations through a corresponding one of said optical amplifiers, wherein said control means is constituted by first and second bandpass filters, for picking up supervisory signals from electrical signals output from said opto-electrical conversion units, and first and second supervisory units, for amplitude-modulating optical output of said laser diode by receiving the supervisory signals from said bandpass filters.

27. An optical repeater as claimed in claim 26, wherein said bandpass filters are constructed such that said supervisory signals include a frequency assigned for each optical repeater in the transmission system and said supervisory signals are continuously transferred from one of said terminal stations, and when the transfer of said supervisory signals is stopped, the loop-back instruction or an output-cut instruction is set.

* * * * *